(12) United States Patent
Nishimura et al.

(10) Patent No.: US 11,189,048 B2
(45) Date of Patent: Nov. 30, 2021

(54) INFORMATION PROCESSING SYSTEM, STORING MEDIUM STORING PROGRAM, AND INFORMATION PROCESSING DEVICE CONTROLLING METHOD FOR PERFORMING IMAGE PROCESSING ON TARGET REGION

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 16/504,645

(22) Filed: Jul. 8, 2019

(65) Prior Publication Data

US 2020/0034982 A1  Jan. 30, 2020

(30) Foreign Application Priority Data

Jul. 24, 2018 (JP) .............................. JP2018-138087

(51) Int. Cl.
| | |
|---|---|
| *G06K 9/00* | (2006.01) |
| *G06K 9/32* | (2006.01) |
| *G06T 7/70* | (2017.01) |
| *H04W 4/44* | (2018.01) |
| *H04W 4/46* | (2018.01) |

(52) U.S. Cl.
CPC ............ *G06T 7/70* (2017.01); *G06K 9/00791* (2013.01); *G06K 9/325* (2013.01); *H04W 4/44* (2018.02); *G06T 2207/30252* (2013.01); *H04W 4/46* (2018.02)

(58) Field of Classification Search
None
See application file for complete search history.

(56) References Cited

U.S. PATENT DOCUMENTS

| | | | |
|---|---|---|---|
| 2006/0195199 A1 | 8/2006 | Iwasaki et al. | |
| 2009/0180583 A1* | 7/2009 | Park ...................... | G06M 1/101 377/9 |
| 2012/0133497 A1* | 5/2012 | Sasaki ................ | G06K 9/00805 340/425.5 |
| 2012/0320212 A1* | 12/2012 | Aimura ..................... | B60R 1/00 348/148 |

(Continued)

FOREIGN PATENT DOCUMENTS

JP    2007-209008 A    8/2007

*Primary Examiner* — Idowu O Osifade
(74) *Attorney, Agent, or Firm* — Oliff PLC

(57) ABSTRACT

An information processing system includes a vehicle, and a server configured to communicate with the vehicle. The vehicle generates a captured image of scenery outside the vehicle. The vehicle or the server: starts a first detection processing of successively detecting a first subject in the captured image; determines, as a target region, a partial region of the captured image including a prescribed number of first subjects when the prescribed number of the first subjects are detected; terminates the first detection processing of the target region; and performs image processing of lowering visibility of an image on the target region. The server then transmits the captured image subjected to the image processing to a transmission destination other than the vehicle.

8 Claims, 10 Drawing Sheets

(56) References Cited

U.S. PATENT DOCUMENTS

| | | | | |
|---|---|---|---|---|
| 2014/0350854 A1* | 11/2014 | Sugimoto | .......... | G01C 21/3605 |
| | | | | 701/537 |
| 2015/0186736 A1* | 7/2015 | Han | .................. | G06K 9/00362 |
| | | | | 382/103 |
| 2017/0248434 A1* | 8/2017 | Best | ................. | G08G 1/096716 |
| 2017/0323448 A1* | 11/2017 | Whiting | ............. | G06K 9/00362 |
| 2018/0144207 A1* | 5/2018 | Shigemura | ............ | G01S 13/862 |
| 2019/0236939 A1* | 8/2019 | Zhang | ................. | G08G 1/0116 |
| 2019/0318172 A1* | 10/2019 | Oami | ................. | G06K 9/00778 |
| 2020/0090005 A1* | 3/2020 | Ghosh | ................. | G06K 9/6262 |
| 2020/0134875 A1* | 4/2020 | Yi | ........................ | G06K 9/6255 |
| 2020/0257909 A1* | 8/2020 | Korman | ................ | G08G 1/143 |
| 2020/0372793 A1* | 11/2020 | Weizman | ................ | G08G 1/04 |
| 2020/0382701 A1* | 12/2020 | Mitsui | ................ | H04N 21/4223 |

* cited by examiner

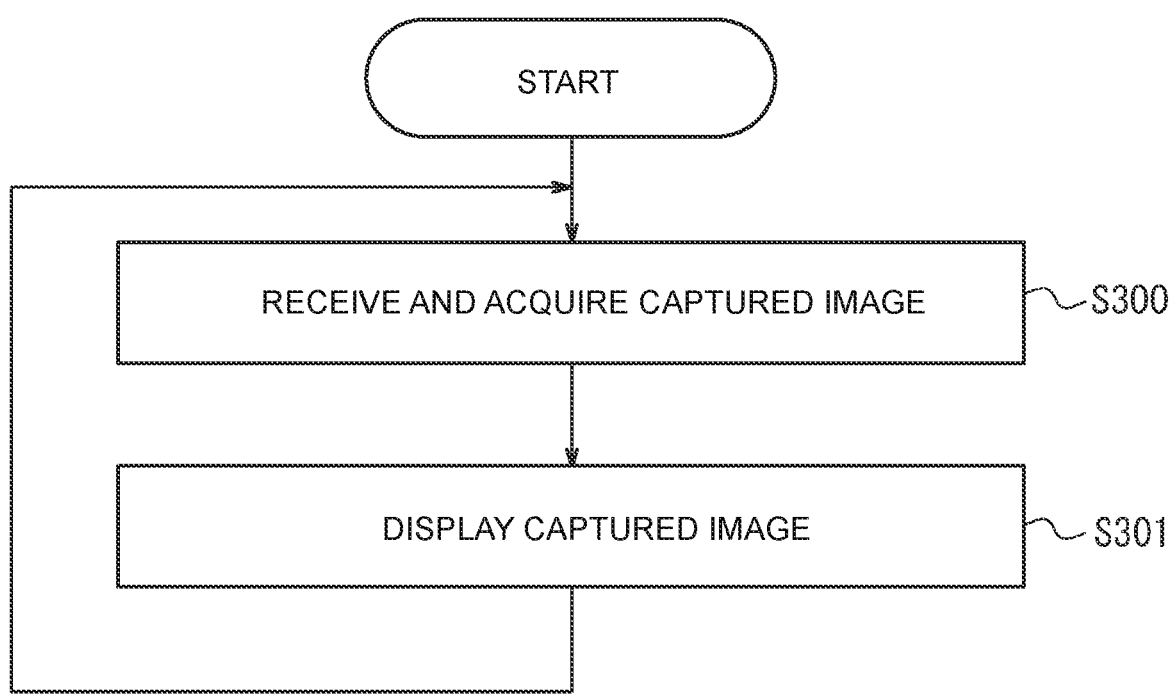

INFORMATION PROCESSING SYSTEM, STORING MEDIUM STORING PROGRAM, AND INFORMATION PROCESSING DEVICE CONTROLLING METHOD FOR PERFORMING IMAGE PROCESSING ON TARGET REGION

INCORPORATION BY REFERENCE

The disclosure of Japanese Patent Application No. 2018-138087 filed on Jul. 24, 2018 including the specification, drawings and abstract is incorporated herein by reference in its entirety.

BACKGROUND

1. Technical Field

The disclosure relates to an information processing system, a storing medium that stores a program, and a method for controlling an information processing device.

2. Description of Related Art

Image processing techniques for processing an image of a plurality of subjects are known. For example, Japanese Patent Application Publication No. 2007-209008 (JP 2007-209008 A) describes a configuration in which a density of a crowd is calculated based on a ratio of an area of a potential head portion region detected from an entire image to an area of the entire image.

SUMMARY

In image processing techniques, head portions are detected for each person in an image. Thus, when the number of people in the image increases, an increase in processing load and an increase in detection errors may occur. Thus, there is still room for improvement in the technique of image processing for processing an image of a plurality of subjects.

The disclosure provides an information processing system that processes an image of subjects.

A first aspect of the disclosure relates to an information processing system that has a vehicle, and a server configured to communicate with the vehicle. The vehicle generates a captured image of scenery outside the vehicle. The vehicle or the server: starts a first detection processing of successively detecting a first subject in the captured image; determines, as a target region, a partial region of the captured image including a prescribed number of first subjects when the prescribed number of the first subjects are detected; terminates the first detection processing of the target region; and performs image processing of lowering visibility of an image on the target region. The server then transmits the captured image subjected to the image processing to a transmission destination other than the vehicle.

In the first aspect described above, the vehicle or the server may restart the first detection processing of a region of the captured image excluding the target region when the first detection processing of the target region is terminated.

In the first aspect described above, the first subject may include at least one of a person and a license plate.

In the first aspect described above, the vehicle or the server may perform a second detection processing of detecting a second subject in the captured image, and at least one of a shape and a size of the target region may differ based on whether the second subject is detected.

In the first aspect described above, the second subject may include at least one of a pedestrian crossing, a pedestrian bridge, and a sidewalk.

In the first aspect described above, the transmission destination may include a following vehicle that travels behind the vehicle.

A second aspect of the disclosure relates to a computer-readable storing medium that stores a program. The program causes an information processing device to: acquire a captured image of scenery outside a vehicle; successively detect a first subject in the captured image; determine, as a target region, a region of the captured image including a prescribed number of the first subjects when the prescribed number of first subjects are detected; perform image processing of lowering visibility of an image on the target region; and output the captured image subjected to the image processing.

A third aspect of the disclosure relates to a method for controlling an information processing device. The method for controlling includes: acquiring a captured image of scenery outside a vehicle; successively detecting a first subject in the captured image; determining, as a target region, a region of the captured image including a prescribed number of the first subjects when the prescribed number of first subjects are detected; performing image processing of lowering visibility of an image on the target region; and outputting the captured image subjected to the image processing.

With the information processing system, the computer-readable storing medium that stores a program, and the method for controlling an information processing device according to the disclosure, it is possible to reduce the occurrences of inconveniences when processing an image of a plurality of subjects.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

https://topam-ape-patent.tec.toyota.co.jp/patweb/patweb.exe?Command=imgform&DocDir=tma20840&ImageNo=2&lang=ja

https://topam-ape-patent.tec.toyota.co.jp/patweb/patweb.exe?Command=imgform&DocDir=tma20840&ImageNo=3&lang=ja

https://topam-ape-patent.tec.toyota.co.jp/patweb/patweb.exe?Command=imgform&DocDir=tma20840&ImageNo=4&lang=ja

https://topam-ape-patent.tec.toyota.co.jp/patweb/patweb.exe?Command=imgform&DocDir=tma20840&ImageNo=5&lang=ja

FIG. 14 is a flowchart of an operation of a second vehicle.

DETAILED DESCRIPTION OF EMBODIMENTS

Figure 1:
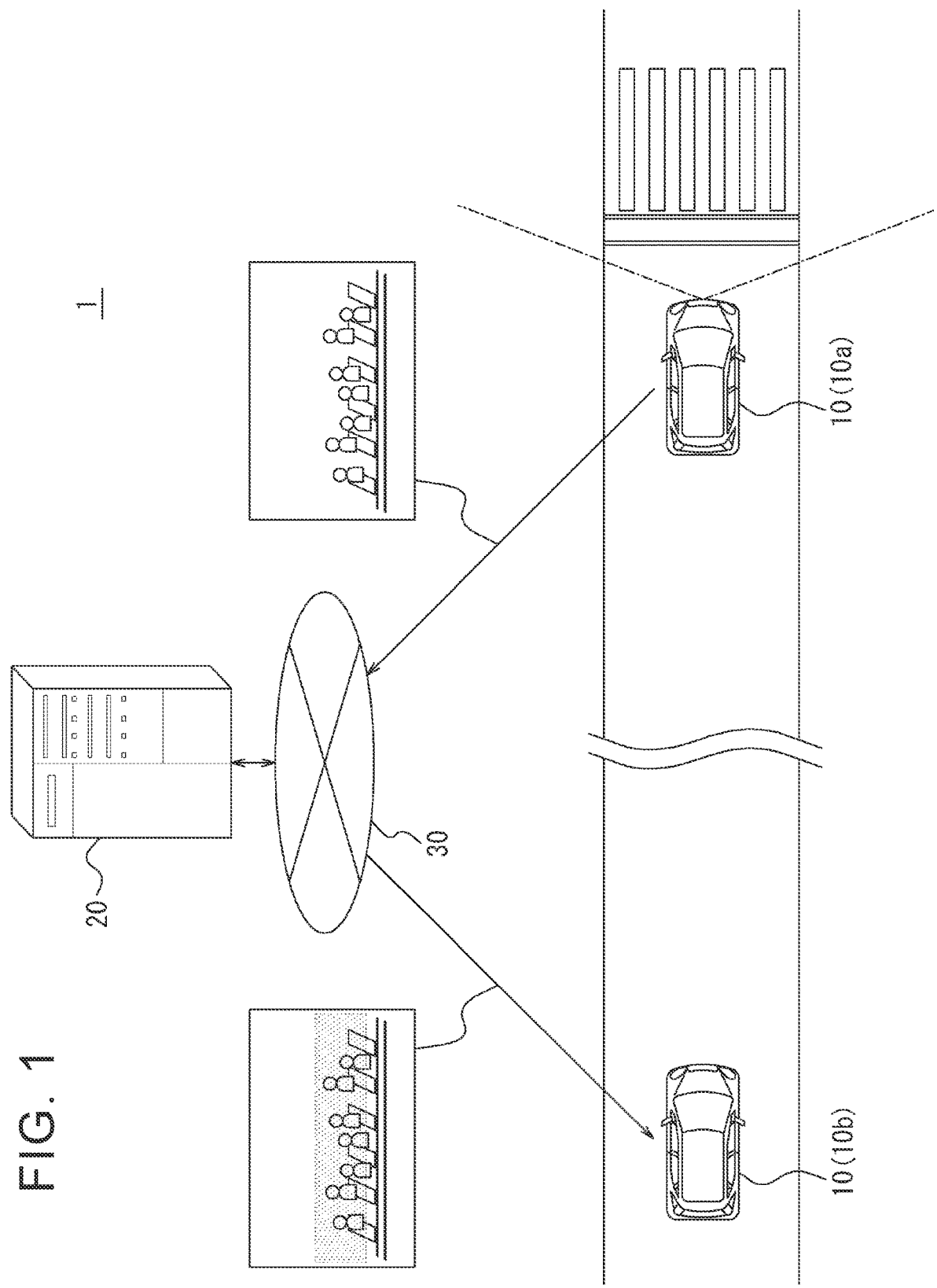
FIG. 1 is a schematic diagram of an information processing system according to an embodiment of the disclosure.

An embodiment of the disclosure will be described below.
Configuration of Information Processing System An outline of an information processing system 1 according to an embodiment of the disclosure will be described with reference to FIG. 1. The information processing system 1 has a plurality of vehicles 10 and a server 20. The vehicles 10 are automobiles, for example. However, the vehicles 10 are not limited to this, and may be any vehicle. In FIG. 1, to simplify the description, only a first vehicle 10*a* and a second vehicle 10*b* are illustrated as the vehicles 10. The second vehicle 10*b* is a following vehicle that travels behind the first vehicle 10*a*. However, the second vehicle 10*b* is not limited to this. The server 20 includes one server or a plurality of servers that are able to communicate with each other. The vehicles 10 and the server 20 are able to communicate with each other via a network 30 including a mobile communication network and the Internet etc.

The first vehicle 10*a* generates a captured image of scenery outside the vehicle, and transmits the captured image to the server 20. A plurality of people crossing a pedestrian crossing etc. may appear in the captured image. A plurality of captured images that are successively generated at a prescribed frame rate may form a moving image. When the server 20 detects a prescribed number (two, for example) of people in the captured image by image recognition, the server 20 terminates image recognition and determines a region that includes the detected prescribed number of people in the captured image as a target region. The server 20 performs image processing (mosaic processing, for example) of lowering visibility of the target region of the captured image, and transmits the processed image to the second vehicle 10*b*. Then, the second vehicle 10*b* displays the captured image subjected to image processing.

In this way, in the embodiment, an occupant of the second vehicle 10*b* recognizes the conditions outside the first vehicle 10*a* that is a preceding vehicle by visually checking the captured image. Thus, it is possible to determine whether to change course, for example. Here, since visibility is lowered only for the target region that is a partial region of the captured image generated by the first vehicle 10*a*, it is possible to protect personal information of the people in the target region while maintaining visibility of other regions. It is also possible to reduce data size of the captured image by lowering visibility of the target region of the captured image. The more people there are in the captured image, the higher the possibility is that people other than the detected prescribed number of people are included in the target region. With the embodiment, it is possible to protect personal information of more people than the prescribed number just by detecting the prescribed number of people in the captured image. Thus, there is no need to individually detect all of the people in the captured image. Therefore, even if there is a relatively large number of people in the captured image, occurrences of an increase in processing load and an increase in detection errors are reduced, for example.

Figure 2:
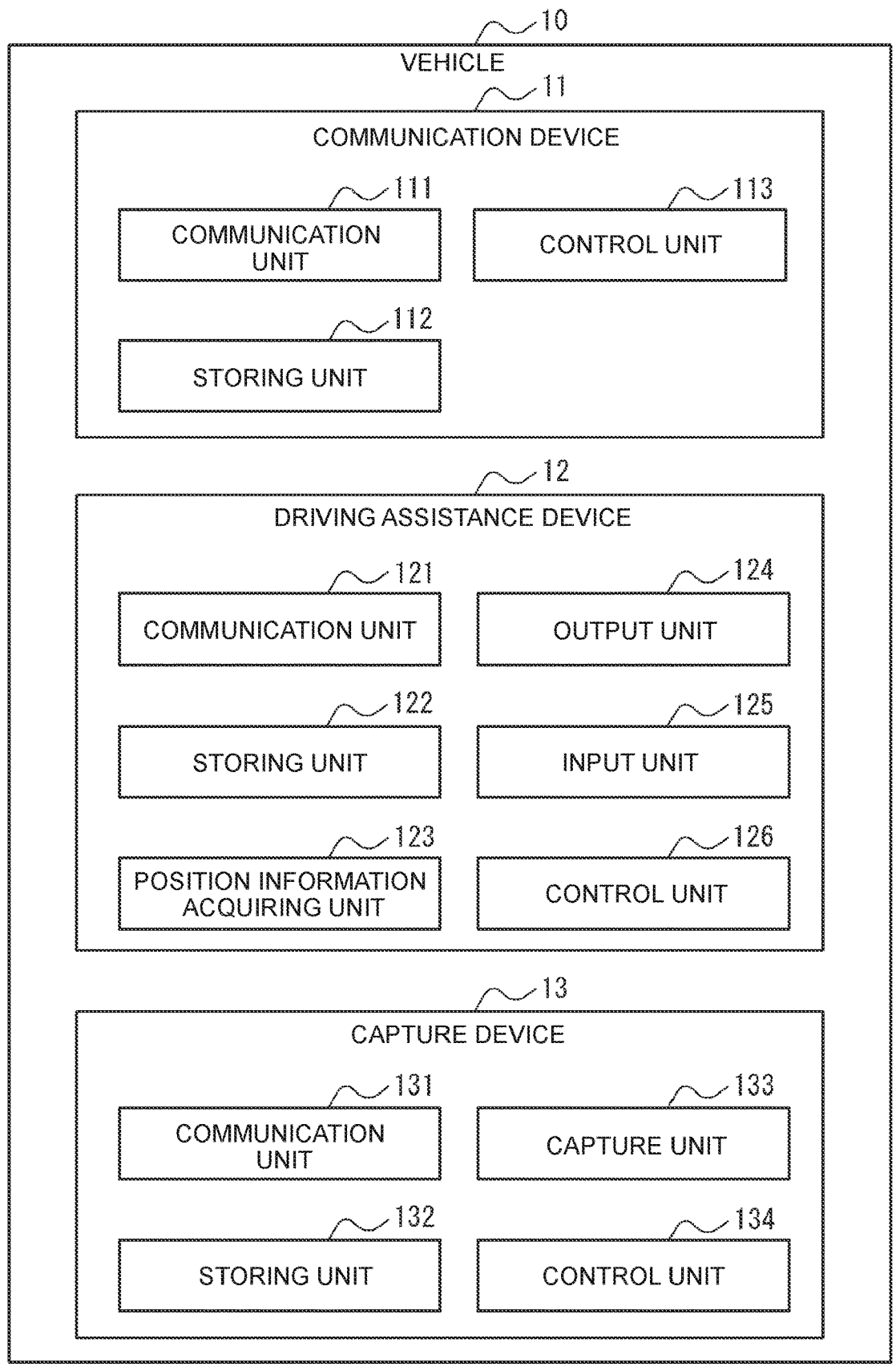
FIG. 2 is a block diagram illustrating an overall structure of a vehicle.

The configurations of the information processing system 1 will be described in detail.
Configuration of Vehicle As shown in FIG. 2, the vehicle 10 has a communication device 11, a driving assistance device 12, and a capture device 13. The communication device 11, the driving assistance device 12, and the capture device 13 are connected so as to be able to communicate with each other via an on-board network such as a controller area network (CAN) or a dedicated line.

The communication device 11 is an on-board communication device such as a data communication module (DCM). Specifically, the communication device 11 has a communication unit 111, a storing unit 112, and a control unit 113.

The communication unit 111 includes a communication module that communicates via an on-board network or a dedicated line. The communication unit 111 includes a communication module that is connected to the network 30. For example, the communication unit 111 may include a communication module that conforms to 4G (4th Generation) and 5G (5th Generation) mobile communication standards etc. In the embodiment, the vehicle 10 is connected to the network 30 via the communication unit 111.

The storing unit 112 includes one or more memory units. In the embodiment, a "memory unit" is a semiconductor memory, a magnetic memory, or an optical memory etc. However, the "memory unit" is not limited to these. The memory units included in the storing unit 112 may function as a main storage device, an auxiliary storage device, or a cache memory, for example. The storing unit 112 stores information used for operation of the communication device 11. For example, the storing unit 112 may store a system program, an application program, and identification information of the vehicle 10 etc. Here, identification information of the communication device 11 or the driving assistance device 12 provided in the vehicle 10 may be used as identification information of the vehicle 10. Information stored in the storing unit 112 may be updatable with information acquired from the network 30 via the communication unit 111, for example.

The control unit 113 has one or more processors. In the embodiment, a "processor" is a general-purpose processor or a processor dedicated to a specific processing. However, the "processor" is not limited to these. The control unit 113 controls the operation of the entire communication device 11. In the embodiment, the vehicle 10 and the server 20 communicate with each other via the communication device 11 controlled by the control unit 113.

For example, the control unit 113 acquires the captured image of scenery outside the vehicle from the capture device 13. The control unit 113 acquires position information of the vehicle 10 when the captured image is generated, from the driving assistance device 12. The control unit 113 transmits probe data to the server 20. The probe data includes the acquired captured image and position information, identification information of the vehicle 10, and time information of when the captured image is generated. Probe data may be transmitted each time the captured image is generated or may be transmitted after being accumulated in the storing unit 112 for a period of time. Probe data is not limited to the information described above, and may include information related to the vehicle 10 such as a speed, an acceleration, and a steering angle of the vehicle 10.

The control unit 113 may receive a captured image generated in another vehicle 10 from the server 20. The captured image may be distributed by a pull-type distribution from the server 20 based on a request from the vehicle 10 or a push-type distribution from the server 20. In the target region that is a partial region of the captured image, image processing of lowering visibility may be performed by the server 20. The control unit 113 outputs the received captured image to the driving assistance device 12. The captured image may be output each time the captured image is received from the server 20 or may be output after being accumulated in the storing unit 112 for a period of time.

The driving assistance device 12 is a device that performs driving assistance of the vehicle 10. The driving assistance provides route guidance to a destination or warns the driver, for example. However, the driving assistance is not limited to these. The driving assistance device 12 may be a navigation device that performs route guidance, for example. The driving assistance may be performed by cooperation of the driving assistance device 12 and an electronic control unit (ECU) of the vehicle 10 etc. Specifically, the driving assistance device 12 includes a communication unit 121, a storing unit 122, a position information acquiring unit 123, an output unit 124, an input unit 125, and a control unit 126.

The communication unit 121 includes a communication module that communicates via an on-board network or a dedicated line.

The storing unit 122 includes one or more memory units. The memory units included in the storing unit 122 may function as a main storage device, an auxiliary storage device, or a cache memory, for example. The storing unit 122 stores information used for operation of the driving assistance device 12. For example, the storing unit 122 may store a system program, an application program, and road map information etc. Information stored in the storing unit 122 may be updatable with information acquired from the network 30 via the communication device 11, for example.

The position information acquiring unit 123 includes one or more receiving devices that are compatible with an appropriate satellite positioning system. For example, the position information acquiring unit 123 may include a global positioning system (GPS) receiving device. The position information acquiring unit 123 acquires position information of the vehicle 10 in which the driving assistance device 12 is installed.

The output unit 124 includes one or more output interfaces that output information to the user. For example, an output interface included in the output unit 124 is a display that outputs information by images, or a speaker that outputs information by sounds etc. However, the output interface is not limited to these. For example, the display is a panel display or a head-up display. However, the display is not limited to these. In the embodiment, "images" may include text, still images, and moving images.

The input unit 125 includes one or more input interfaces that detect a user input. For example, an input interface included in the input unit 125 is a physical key, a capacitive key, a touchscreen that is integrally provided with a panel display of the output unit 124, or a microphone that receives voice input etc. However, the input interface is not limited to these.

The control unit 126 includes one or more processors. The control unit 126 controls the operation of the entire driving assistance device 12.

For example, the control unit 126 outputs position information of the vehicle 10 when the captured image is generated by the capture device 13, to the communication device 11. The control unit 126 acquires the captured image generated in the other vehicle 10 via the server 20 and the communication device 11, and causes the display of the output unit 124 to display the captured image. The control unit 126 may display the acquired captured images as a moving image of a prescribed frame rate. As described above, image processing of lowering visibility may be performed on the target region that is a partial region of the captured image.

The capture device 13 is a device that generates the captured image of the subject. In the embodiment, the capture device 13 is installed in the vehicle 10 so as to be able to capture scenery outside the vehicle 10. The capture device 13 may be an on-board camera used for driving assistance of a vehicle or a drive recorder etc. Specifically, the capture device 13 includes a communication unit 131, a storing unit 132, a capture unit 133, and a control unit 134.

The communication unit 131 includes a communication module that communicates via an on-board network or a dedicated line.

The storing unit 132 includes one or more memory units. The memory units included in the storing unit 132 may function as a main storage device, an auxiliary storage device, or a cache memory, for example. The storing unit 132 stores information used for operation of the capture device 13. For example, the storing unit 132 may store a system program, and an application program etc. Information stored in the storing unit 132 may be updatable with information acquired from the network 30 via the communication device 11, for example.

The capture unit 133 includes an optical element such as a lens and an image sensor. In the embodiment, an "image sensor" is a complementary metal-oxide-semiconductor (CMOS) image sensor or a charge-coupled device (CCD) image sensor etc. However, the "image sensor" is not limited to these.

The control unit 134 includes one or more processors. The control unit 134 controls the operation of the entire capture device 13.

For example, the control unit 134 generates the captured image of scenery outside the vehicle 10 captured by the capture unit 133 and outputs the captured image to the communication device 11. The control unit 134 may successively generate a plurality of the captured images at a prescribed frame rate. The captured images may be output each time the captured images are generated or may be output after being accumulated in the storing unit 132 for a period of time.

Configuration of Server

Figure 3:
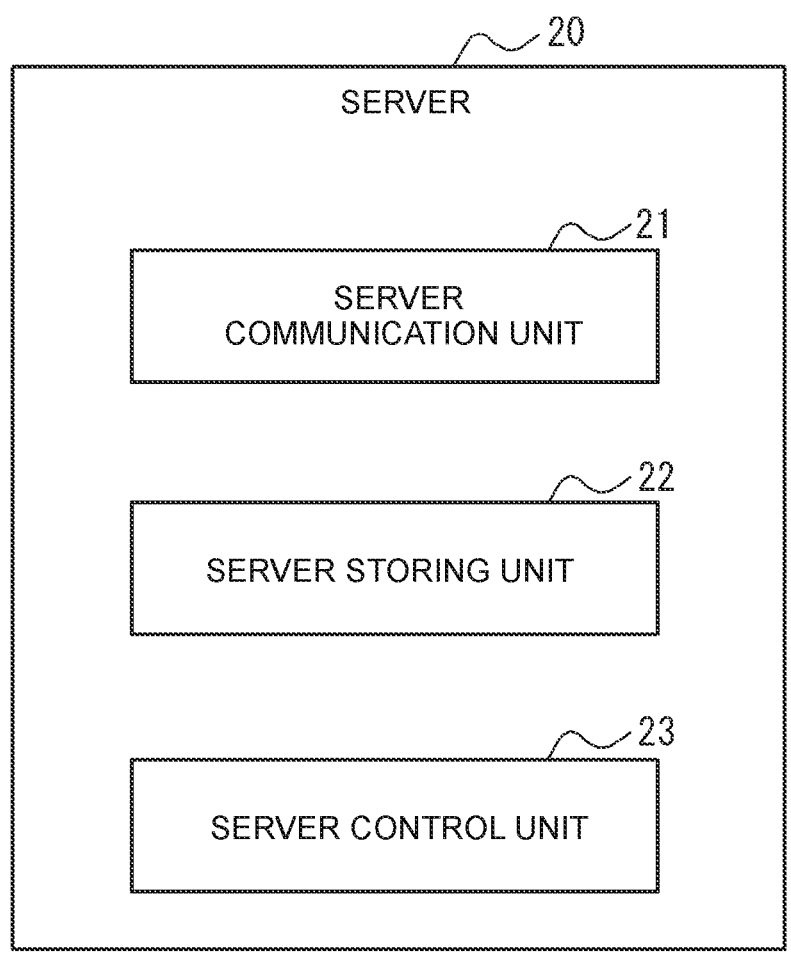
FIG. 3 is a block diagram illustrating an overall structure of a server.

As shown in FIG. 3, the server 20 has a server communication unit 21, a server storing unit 22, and a server control unit 23.

The server communication unit 21 includes a communication module that is connected to the network 30. For example, the server communication unit 21 may include a communication module that conforms to a wired local area network (LAN) standard. In the embodiment, the server 20 is connected to the network 30 via the server communication unit 21.

The server storing unit 22 includes one or more memory units. The memory units included in the server storing unit 22 may function as a main storage device, an auxiliary storage device, or a cache memory, for example. The server storing unit 22 stores information used for operation of the server 20. For example, the server storing unit 22 may store a system program, an application program, road map information, and a database that stores probe data received from the vehicle 10. Information stored in the server storing unit 22 may be updatable with information acquired from the network 30 via the server communication unit 21, for example.

The server control unit 23 includes one or more processors. The server control unit 23 controls the operation of the entire server 20. For example, the server control unit 23 is able to recognize a traveling state of each vehicle 10 by referring to the database stored in the server storing unit 22.

For example, the server control unit 23 also transmits the captured image received from the first vehicle 10a to a transmission destination other than the first vehicle 10a. Hereinafter, the details will be described.

The server control unit 23 receives and acquires probe data from the first vehicle 10a. The server control unit 23 starts a first detection processing of successively detecting a first subject in the captured image included in the probe data. The first subject is a person (head portion or whole body). However, the first subject is not limited to this. The first subject may include any subject that may correspond to personal information when captured, such as a license plate. Any image recognition algorithm such as pattern matching or feature extraction may be applied for detecting the first subject.

Figure 4:
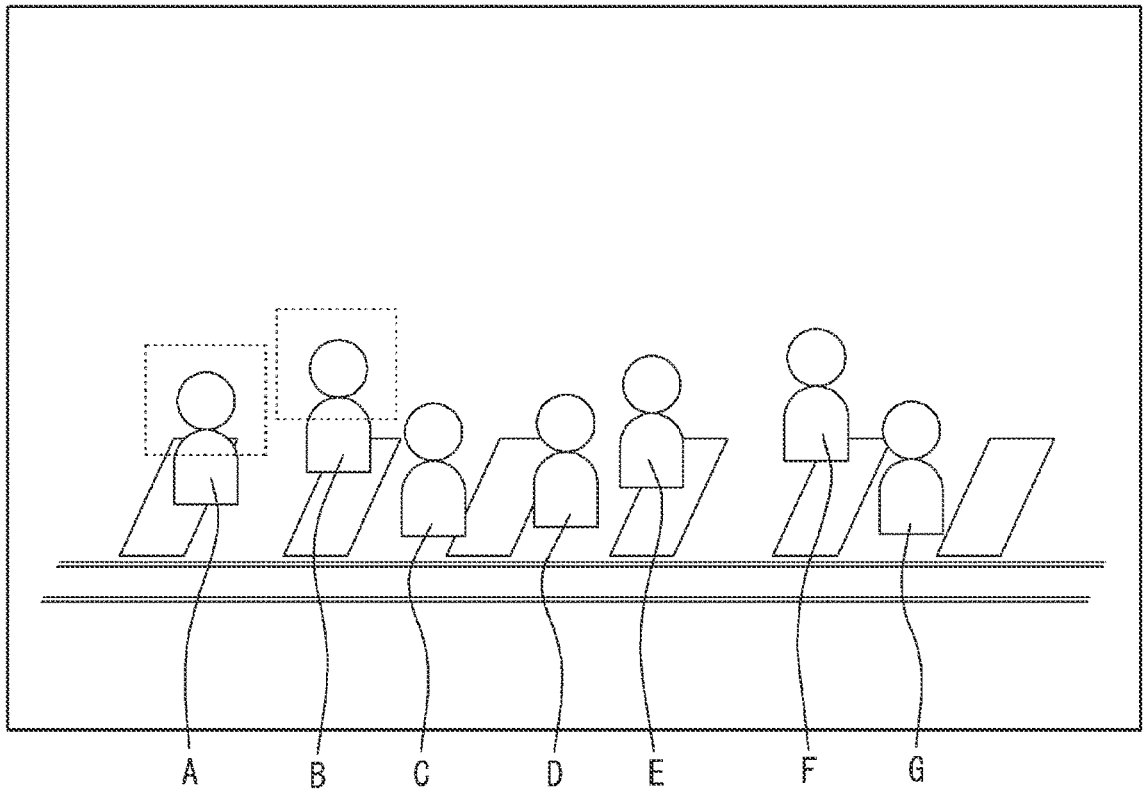
FIG. 4 is a diagram illustrating a first example of an image processing procedure applied to a captured image.
Figure 5:
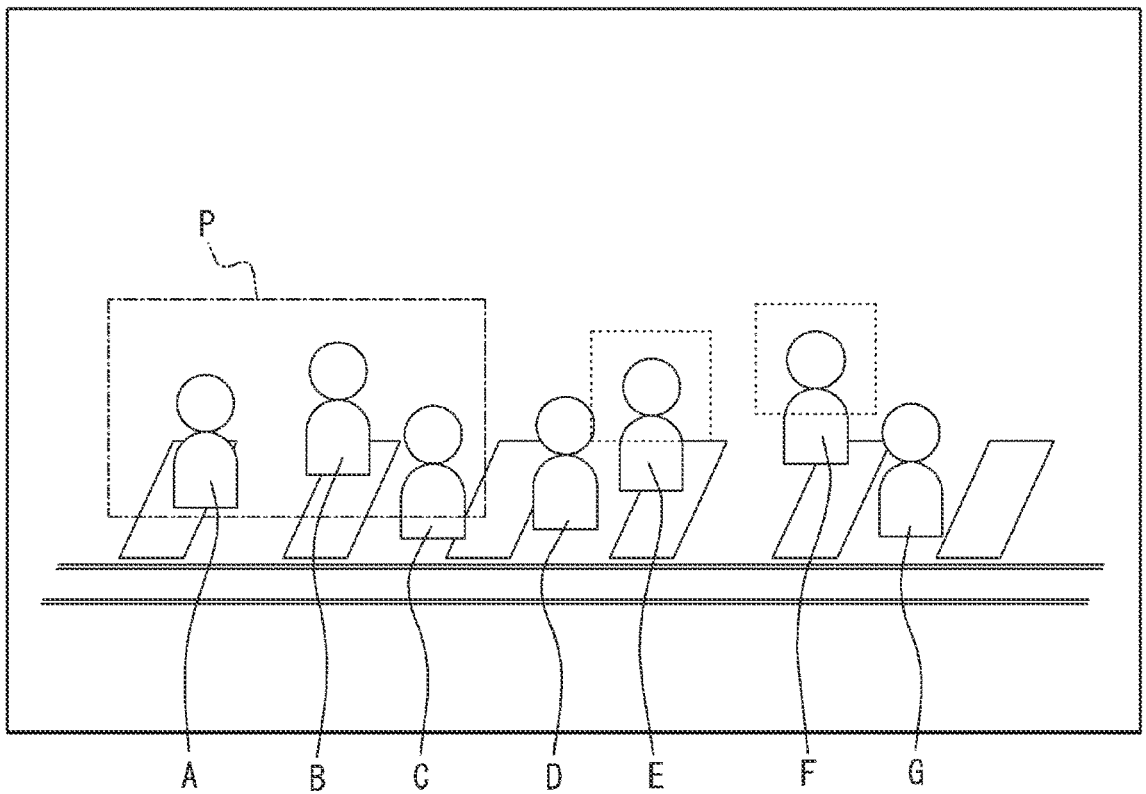
FIG. 5 is a diagram illustrating the first example of the image processing procedure applied to the captured image.

When the prescribed number (two, for example) of first subjects are detected, the server control unit 23 determines a partial region of the captured image including the prescribed number of first subjects as the target region. Here, the server control unit 23 may determine the target region when the prescribed number of first subjects that satisfy a prescribed condition are detected. The prescribed condition is a condition that the prescribed number of first subjects are close to each other in the captured image (for example, a distance between the first subjects is less than a reference value). However, the prescribed condition is not limited to this. The shape and the size of the target region may be determined appropriately. The determination of the target region will be described in detail with reference to FIGS. 4 and 5. In an example illustrated in FIG. 4, two first subjects A and B are detected among the seven first subjects A to G in the captured image. In this case, as illustrated in FIG. 5, a target region P including the first subjects A and B is determined. In the target region P, in addition to the detected first subjects A and B, the first subject C near the first subjects A and B is incidentally included. In FIG. 5, the shape of the target region P is rectangular. However, the shape is not limited to this, and may be any shape such as an ellipse.

Figure 6:
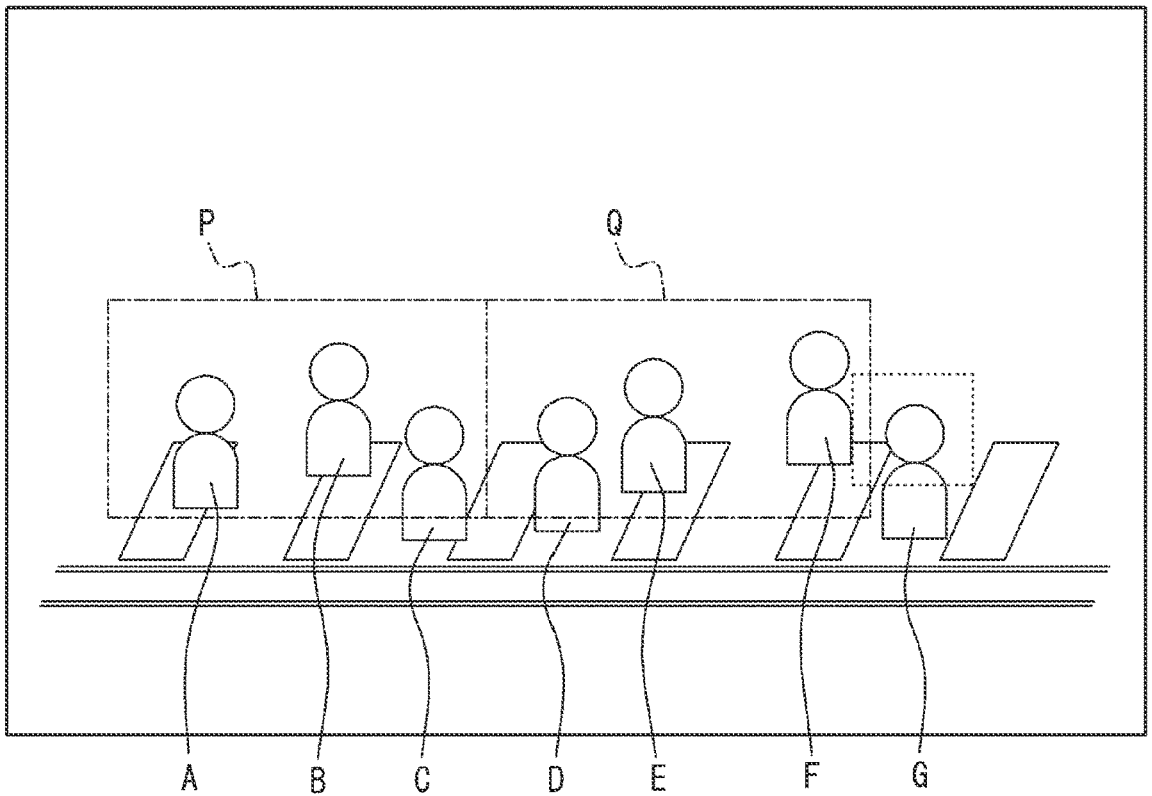
FIG. 6 is a diagram illustrating the first example of the image processing procedure applied to the captured image.

When the target region is determined, the server control unit 23 terminates the first detection processing of the target region and restarts the first detection processing of a region of the captured image excluding the target region. Thus, each time the prescribed number of first subjects are detected, the target region that includes the prescribed number of first subjects is determined. The target regions may overlap or the target regions may be separated. The target regions will be described in detail with reference to FIGS. 5 and 6. In an example illustrated in FIG. 5, after the target region P is determined as described above, the first detection processing is restarted in a region of the captured image excluding the target region P and two first subjects E and F are detected. In this case, as illustrated in FIG. 6, a target region Q including the first subjects E and F is determined. In the target region Q, in addition to the detected first subjects E and F, a first subject D near the first subjects E and F is incidentally included.

Figure 7:
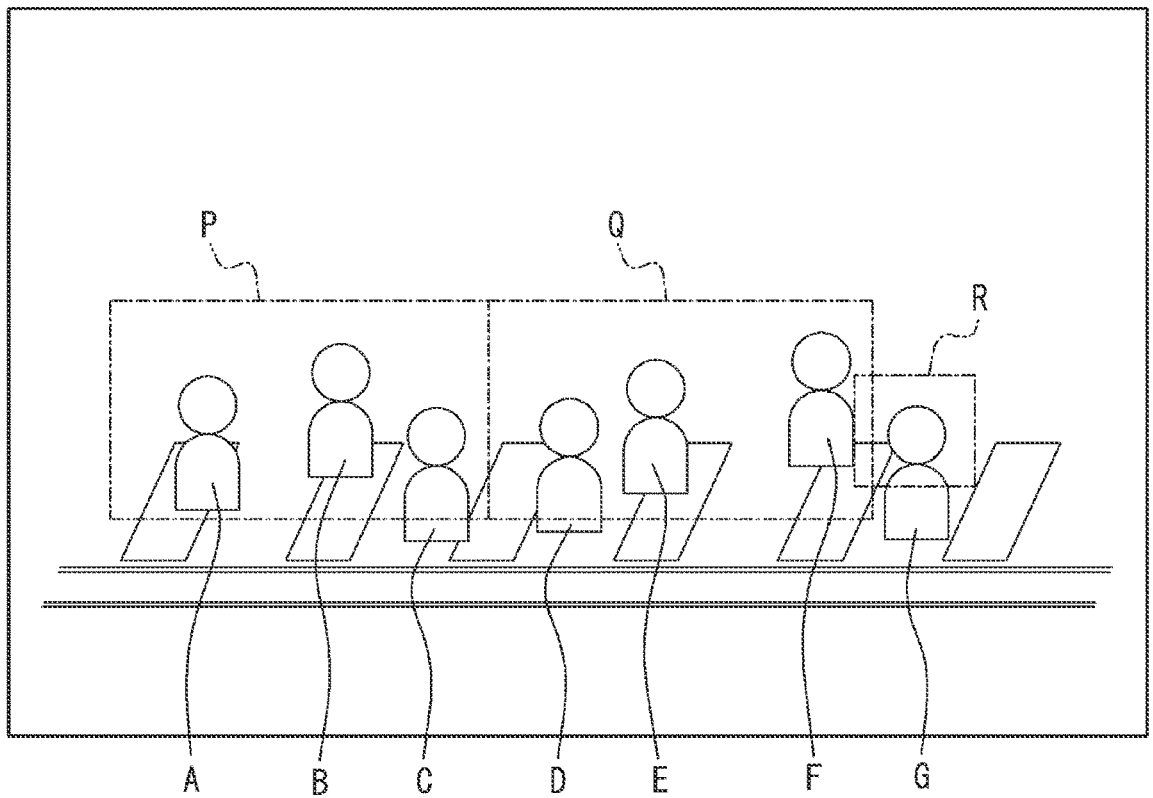
FIG. 7 is a diagram illustrating the first example of the image processing procedure applied to the captured image.

When the prescribed number of first subjects are not detected, and at least one of and less than the prescribed number of first subjects are detected, the server control unit 23 determines a partial region of the captured image as the target region, the partial region individually including the first subjects that are less than the prescribed number. This case will be described in detail with reference to FIGS. 6 and 7. In an example illustrated in FIG. 6, after the target region P and Q are determined as described above, the first detection processing is restarted in a region of the captured image excluding the target regions P and Q, and the first subject G is detected. In this case, as illustrated in FIG. 7, a target region R individually including the first subject G is determined.

All of the first subjects in the captured image are included in the target regions determined as described above. When the server control unit 23 can no longer detect the first subject by the first detection processing (that is, when there is no first subject in a region of the captured image excluding the target regions), the server control unit 23 terminates the first detection processing of the captured image.

Figure 8:
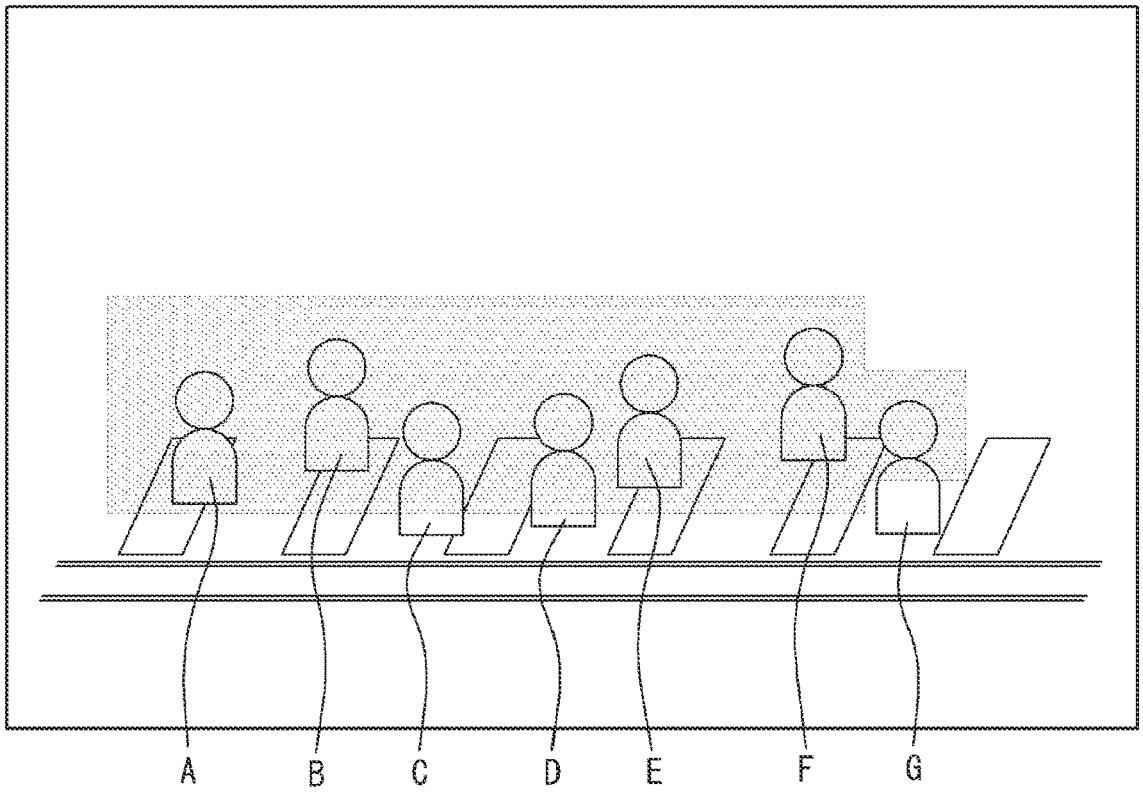
FIG. 8 is a diagram illustrating the first example of the image processing procedure applied to the captured image.

When the target region is determined, the server control unit 23 performs image processing of lowering visibility of an image on the target region. The image processing is mosaic processing, mask processing, or processing of lowering resolution etc. However, the image processing is not limited to this. The image processing will be described in detail with reference to FIGS. 7 and 8. In an example illustrated in FIG. 7, three target regions P to R are determined in the captured image. Image processing of lowering visibility of an image is performed on the target regions P to R. Thus, as illustrated in FIG. 8, visibility of the first subjects A to G is lowered. Therefore, personal information of the first subjects A to G are able to be protected. In contrast, when the target region is not determined (for example, when there is no first subject in the captured image), the server control unit 23 omits image processing.

Figure 9:
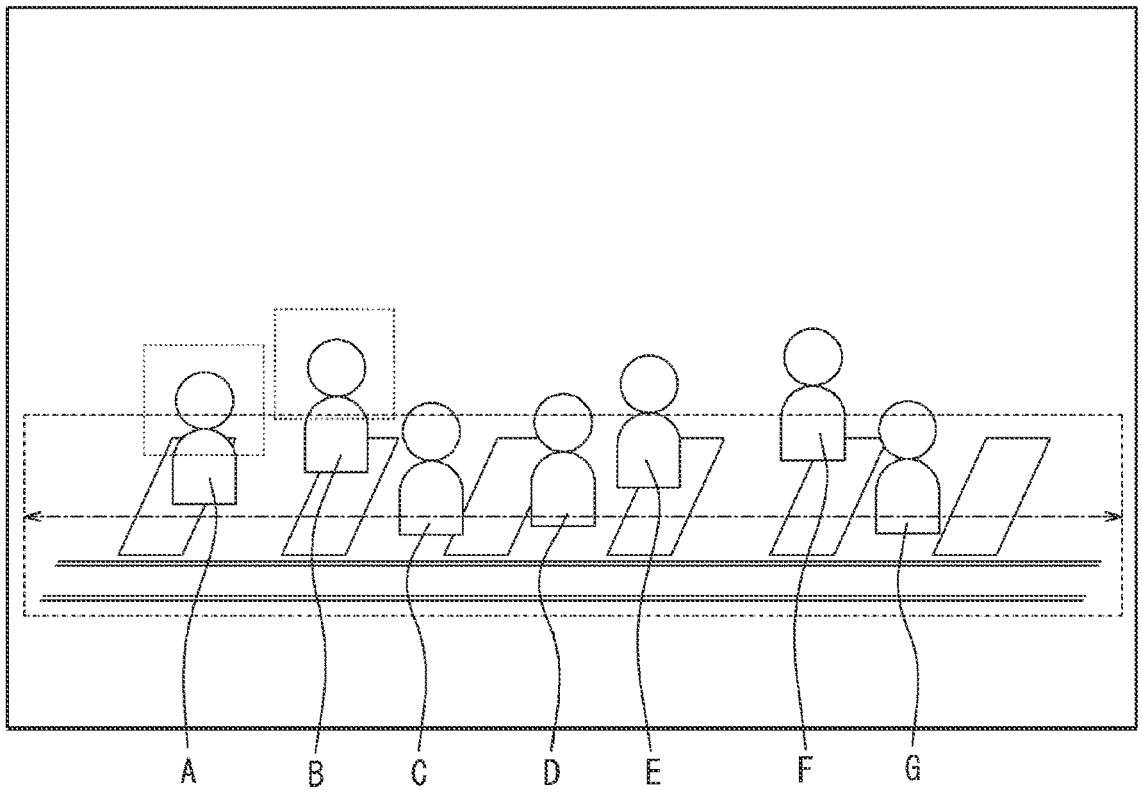
FIG. 9 is a diagram illustrating a second example of the image processing procedure applied to the captured image.
Figure 10:
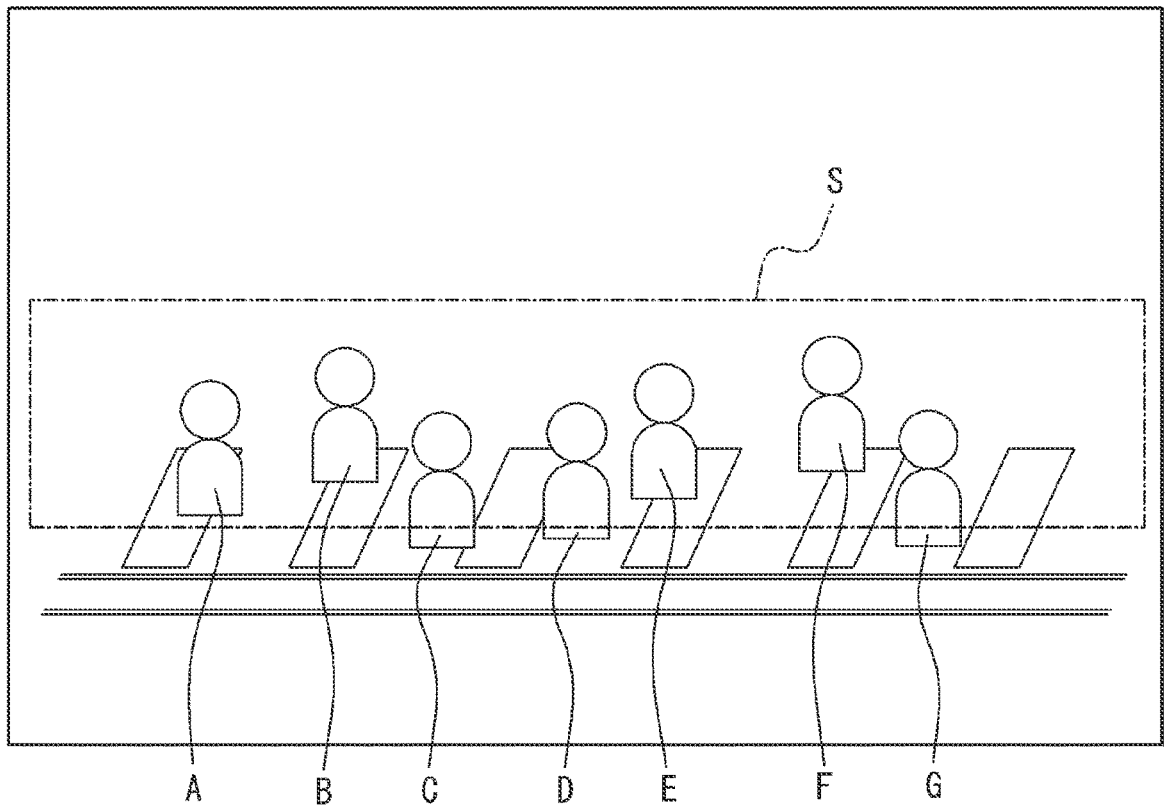
FIG. 10 is a diagram illustrating the second example of the image processing procedure applied to the captured image.
Figure 11:
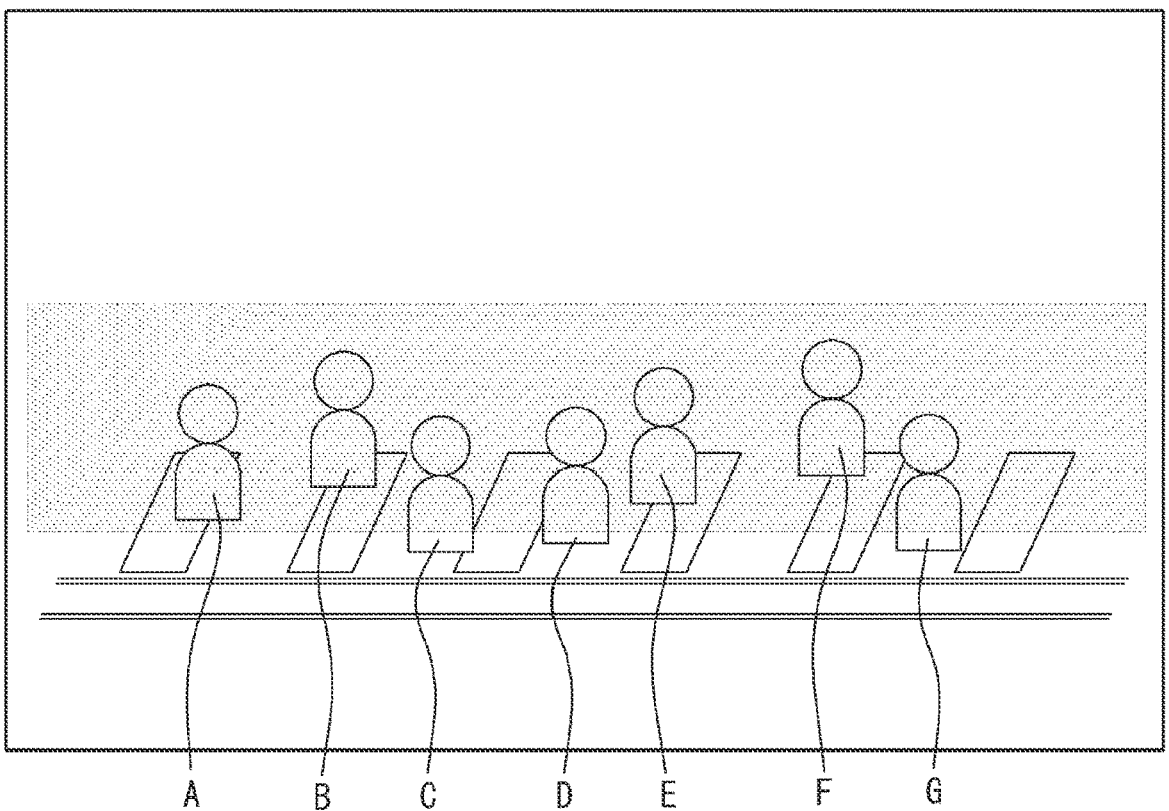
FIG. 11 is a diagram illustrating the second example of the image processing procedure applied to the captured image.

Here, the server control unit 23 may perform a second detection processing of detecting a second subject in the captured image by image recognition and determine the shape and the size of the target region based on a result of the second detection processing. The second subject is a place in which the first subjects may be concentrated, such as a pedestrian crossing, a pedestrian bridge, or a sidewalk. However, the place is not limited to this. Details will be described with reference to FIGS. 9 to 11. In an example illustrated in FIG. 9, a pedestrian crossing extending in a left-right direction (direction in which a long and short dash line arrow extends in the drawing) in the captured image is detected as the second subject by the second detection processing. In this case, when the two first subjects A and B are detected by the first detection processing, a target region S is determined. Here, the target region S includes the two first subjects A and B and extends in the left-right direction along the pedestrian crossing in the captured image, as illustrated in FIG. 10. In the target region S, in addition to the detected first subjects A and B, other first subjects C to G on the pedestrian crossing are incidentally included. Thus, by performing image processing of lowering visibility of an image on the target region S, visibility of the first subjects A to G is lowered, as illustrated in FIG. 11. Therefore, personal information of the first subjects A to G are able to be protected.

When the second subject is detected by the second detection processing, the server control unit 23 may adjust the shape and the size of the target region based on time information of when the captured image is generated. For example, when the captured image is generated at a time period in which the number of pedestrians crossing the pedestrian crossing is thought to be relatively small (for example, at midnight), the shape and the size of the target region may be adjusted so that the area of the target region is smaller (for example, so that a width of the target region S illustrated in FIG. 10 in an up-down direction is shorter) compared to when the captured image is generated at a time period in which the number of pedestrians crossing the pedestrian crossing is thought to be relatively large (for example, during the daytime).

The server control unit 23 transmits the captured image to a transmission destination other than the first vehicle 10a. The captured image may be distributed by a pull-type distribution based on a request from the transmission destination or may be distributed by a push-type distribution from the server control unit 23. In the embodiment, the transmission destination of the captured image is the second vehicle 10b that is the following vehicle that travels behind the first vehicle 10a. However, the transmission destination of the captured image is not limited to this, and may be any electronic device such as a smartphone or computer used by a third person other than the occupants of the first vehicle 10a, or a moving image distribution server. The captured image may be transmitted each time the captured image is received from the first vehicle 10a, or may be transmitted after being accumulated in the server storing unit 22 for a period of time.

Operation Flow of First Vehicle

Figure 12:
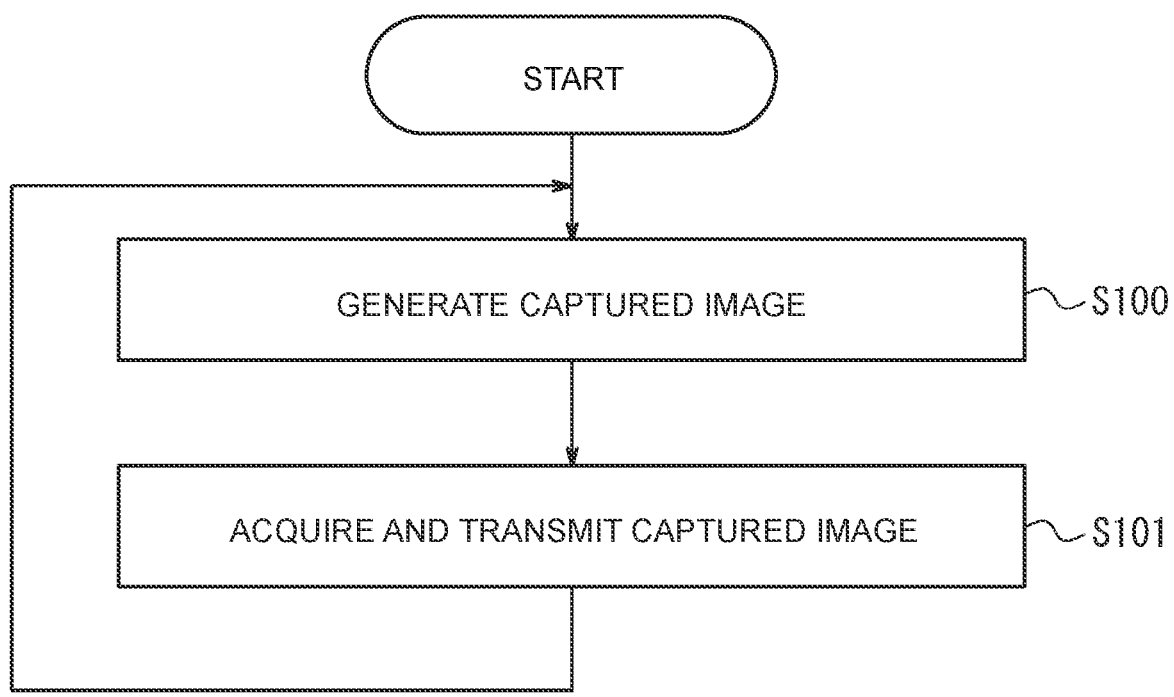
FIG. 12 is a flowchart of an operation of a first vehicle.

An operation flow of the first vehicle 10a will be described with reference to FIG. 12.

Step S100: The capture device 13 of the first vehicle 10a generates the captured image of scenery outside the vehicle.

Step S101: The communication device 11 of the first vehicle 10a acquires the captured image from the capture device 13 and transmits probe data including the captured image to the server 20. Probe data may be transmitted each time the captured image is generated by the capture device 13, or may be transmitted after being accumulated in the storing unit 112 of the communication device 11 for a period of time. Then, the process returns to step S100.

Operation Flow of Server

Figure 13:
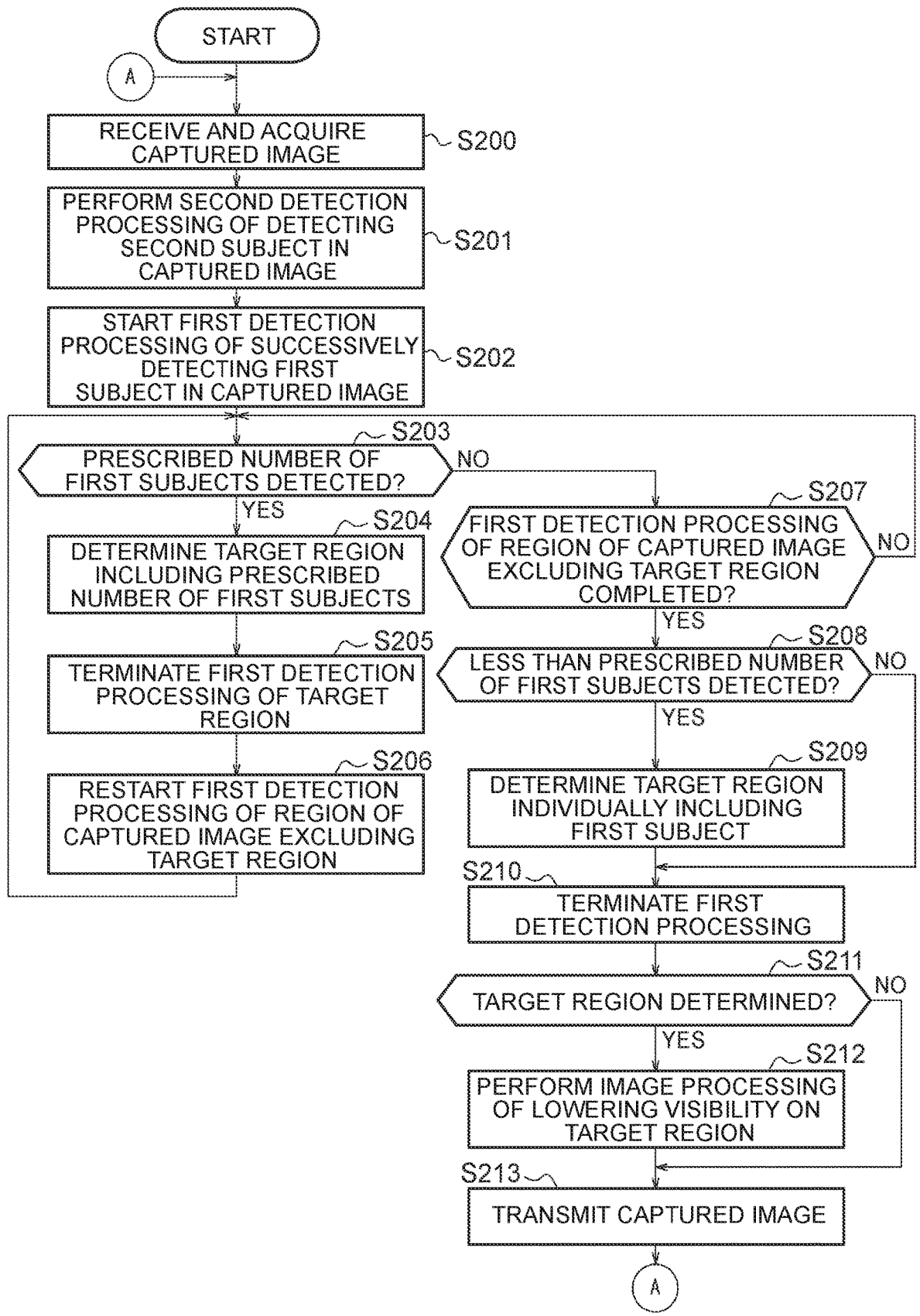
FIG. 13 is a flowchart of an operation of the server.

An operation flow of the server 20 will be described with reference to FIG. 13.

Step S200: The server control unit 23 receives and acquires probe data including the captured image from the first vehicle 10a.

Step S201: The server control unit 23 performs the second detection processing of detecting the second subject in the captured image by image recognition. The second subject in the captured image is able to be detected by executing the second detection processing.

Step S202: The server control unit 23 starts the first detection processing of successively detecting the first subject in the captured image by image recognition. While executing the first detection processing, the server control unit 23 counts the number of detected first subjects.

Step S203: The server control unit 23 determines whether the prescribed number of first subjects (two, for example) is detected. The server control unit 23 may otherwise determine whether the prescribed number of first subjects that satisfy the prescribed condition is detected. The prescribed condition is a condition that the prescribed number of first subjects are close to each other in the captured image (for example, a distance between the first subjects is less than a reference value). However, the prescribed condition is not limited to this. When the server control unit 23 determines that the prescribed number of first subjects are detected (YES in step S203), the process moves on to step S204. In contrast, when the server control unit 23 determines that the prescribed number of first subjects are not detected (NO in step S203), the process moves on to step S207.

Step S204: The server control unit 23 determines a partial region of the captured image including the prescribed number of detected first subjects as the target region. Here, the server control unit 23 may determine the shape and the size of the target region based on the result of the second detection processing.

Step S205: The server control unit 23 terminates the first detection processing of the target region. The server control unit 23 resets the number of detected first subjects to zero.

Step S206: The server control unit 23 restarts the first detection process of a region of the captured image excluding the target region. Then, the process returns to step S203.

Step S207: The server control unit 23 determines whether the first detection processing of a region of the captured image excluding the target region is completed. When the server control unit 23 determines that the first detection processing is completed (YES in step S207), the process moves on to step S208. In contrast, when the server control unit 23 determines that the first detection processing is not completed (NO in step S207), the server control unit 23 continues the first detection processing and the process returns to step S203.

Step S208: The server control unit 23 determines whether the prescribed number of first subjects are detected. When the server control unit 23 determines that the prescribed number of first subjects are detected (YES in step S208), the process moves on to step S209. In contrast, when the server control unit 23 determines that the prescribed number of first subjects are not detected (NO in step S208), the process moves on to step S210.

Step S209: The server control unit 23 determines a partial region of the captured image individually including the detected first subjects that are less than the prescribed number, as the target region.

Step S210: The server control unit 23 terminates the first detection processing of the captured image.

Step S211: The server control unit 23 determines whether the target region of the captured image is determined. When the server control unit 23 determines that the target region is determined (YES in step S211), the process moves on to step S212. In contrast, when the server control unit 23 determines that the target region is not determined (NO in step S211), the process moves on to step S213.

Step S212: The server control unit 23 performs image processing of lowering visibility of an image on the target region.

Step S213: The server control unit 23 transmits the captured image to a transmission destination (here, the second vehicle 10b) other than the first vehicle 10a. Then, the process returns to step S200.

Operation Flow of Second Vehicle

An operation flow of the second vehicle 10b will be described with reference to FIG. 14.

Step S300: The driving assistance device 12 of the second vehicle 10b receives and acquires the captured image generated in the first vehicle 10a from the server 20 via the communication device 11. Image processing of lowering visibility of an image may be performed on the target region that is a partial region of the captured image.

Step S301: The driving assistance device 12 displays the acquired captured image on the display of the output unit 124. Then, the process returns to step S300.

As described above, the information processing system 1 according to the embodiment starts the first detection processing of successively detecting the first subject in the captured image generated by the first vehicle 10a. When the prescribed number of first subjects are detected, the information processing system 1 determines a partial region of the captured image including the prescribed number of first subjects as the target region and terminates the first detection processing of the target region. The information processing system 1 then transmits the captured image, which has been subjected to image processing of lowering visibility of the image of the target region, to a transmission destination other than the first vehicle 10a.

In this configuration, since visibility is lowered only for the target region that is a partial region of the captured image generated by the first vehicle 10a, it is possible to protect personal information of the people that are in the target region while maintaining visibility of other regions. It is also possible to reduce data size of the captured image by lowering visibility of the target region of the captured image. The more first subjects there are in the captured image, the higher the possibility is that the first subjects other than the detected prescribed number of first subjects are included in the target region. With the embodiment, it is possible to protect personal information of more than the prescribed number of the first subjects just by detecting the prescribed number of first subjects in the captured image. Thus, there is no need to individually detect all of the first subjects in the captured image. Therefore, even if there is a relatively large number of people in the captured image, occurrences of an increase in processing load and an increase in detection errors are reduced, for example.

The disclosure was described based on the drawings and the embodiment. However, various deformations and modifications can be easily made by those skilled in the art, based on the present disclosure. Accordingly, the deformations and modifications are included in the scope of the disclosure. For example, the functions of the means and steps etc. are relocatable so as not to logically contradict. A plurality of means or steps may be combined into one, or may be divided.

For example, in the embodiment described above, another device may have a part of the configuration or the function of the communication device 11, the driving assistance device 12, and the capture device 13 installed in the vehicle 10. In the embodiment described above, a part of the processing performed in the vehicle 10 may be performed in the server 20, and a part of the processing performed in the server 20 may be performed in the vehicle 10. Processing performed by the server 20 in the embodiment described above, such as the first detection processing and the second detection processing of the captured image, determination of the target region, and image processing of lowering visibility may be performed by the first vehicle 10a.

In the embodiment, the configuration is described in which the first detection processing and the second detection processing are performed for the captured images successively generated at the prescribed frame rate in order to determine the target region. However, once the target region has been determined through the first detection processing and the second detection processing for the captured image of a frame n, the first detection processing and the second detection processing may be omitted for the subsequent prescribed number of captured images of frames n+1, n+2, . . . , and the target region that is the same as that of the frame n may be determined. With this configuration, the execution frequency of the first detection processing and the second detection processing is decreased and thus, processing load is decreased. Here, the number of frames in which the first detection processing and the second detection processing are omitted may be determined based on the speed of the first vehicle 10a. For example, the faster the speed of the first vehicle 10a is, the smaller the number of frames in which the first detection processing and the second detection processing are omitted may be.

In the embodiment described above, the configuration in which the first detection processing is performed for the captured image is described. However, the first detection processing may be omitted. For example, the second detection processing may be performed for the captured image and the target region may be determined based on the detected second subject. Specifically, when a pedestrian crossing in the captured image is detected as the second subject, a partial region of the captured image along the pedestrian crossing is able to be determined as the target region without performing the first detection processing. With this configuration, it is possible to protect personal information and also omit the first detection processing for the captured image of the second subject, and thus, processing load is reduced.

For example, it is also possible to cause a general-purpose electronic device such as a smartphone or a computer to function as the communication device 11, the driving assistance device 12, the capture device 13, or the server 20 according to the embodiment described above. Specifically, a program including processes that realize the functions of the communication device 11 etc. according to the embodiment is stored in a memory unit of an electronic device and the program is read and performed by a processor of the electronic device. Thus, the disclosure according to the embodiment is able to be realized as a program that can be performed by a processor.

What is claimed is:

1. An information processing system comprising:
   a vehicle; and
   a server configured to communicate with the vehicle, wherein
   the vehicle generates a captured image of scenery outside the vehicle,
   the vehicle or the server:
   starts a first detection processing of successively detecting first subjects in the captured image;
   determines, as a target region, a partial region of the captured image including a prescribed number of the first subjects, wherein the prescribed number is greater than one, and the target region is determined only when the prescribed number of the first subjects is detected;
   terminates the first detection processing of the target region; and
   after terminating the first detection processing, performs image processing of lowering visibility of the target region without changing visibility of a region other than the target region, wherein the target region includes the prescribed number of the first subjects and portions of the captured image located between the first subjects, and the image processing lowers the visibility of the entire target region, and
   the server transmits the captured image subjected to the image processing to a transmission destination other than the vehicle.

2. The information processing system according to claim 1, wherein the vehicle or the server restarts the first detection processing for regions of the captured image excluding the target region when the first detection processing of the target region is terminated and before the image processing is performed.

3. The information processing system according to claim 1, wherein the first subjects include at least one of a person and a license plate.

4. The information processing system according to claim 1,
   wherein the vehicle or the server performs a second detection processing of detecting a second subject in the captured image, and
   wherein at least one of a shape and a size of the target region differs based on whether the second subject is detected.

5. The information processing system according to claim 4, wherein the second subject includes at least one of a pedestrian crossing, a pedestrian bridge, and a sidewalk.

6. The information processing system according to claim 1, wherein the transmission destination includes a following vehicle that travels behind the vehicle.

7. A non-transitory computer-readable storing medium that stores a program, wherein the program causes an information processing device to: acquire a captured image of scenery outside a vehicle; successively detect first subjects in the captured image; determine, as a target region, a partial region of the captured image including a prescribed number of the first subjects, wherein the prescribed number is greater than one, and the target region is determined only when the prescribed number of the first subjects is detected; after terminating detection of the one or more first subjects, perform image processing of lowering visibility of the target region without changing visibility of a region other than the target region, wherein the target region includes the prescribed number of the first subjects and portions of the captured image located between the first subjects, and the image processing lowers the visibility of the entire target region; and output the captured image subjected to the image processing.

8. A method for controlling an information processing device, the method comprising:
   acquiring a captured image of scenery outside a vehicle;
   successively detecting first subjects in the captured image;
   determining, as a target region, a partial region of the captured image including a prescribed number of the first subjects, wherein the prescribed number is greater than one, and the target region is determined only when the prescribed number of the first subjects is detected;
   after terminating detection of the one or more first subjects, performing image processing of lowering visibility of the target region without changing visibility of a region other than the target region, wherein the target region includes the prescribed number of the first subjects and portions of the captured image located between the first subjects, and the image processing lowers the visibility of the entire target region; and
   outputting the captured image subjected to the image processing.

* * * * *